United States Patent
Negoro (10) Patent No.: US 7,066,409 B2
(45) Date of Patent: Jun. 27, 2006

(54) FLUID DELIVERY TUBE STRUCTURAL BODY

(75) Inventor: Katsuji Negoro, Kishiwada (JP)

(73) Assignee: BIC Kogyo K.K., Osaka (JP)

( * ) Notice: Subject to any disclaimer, the term of this patent is extended or adjusted under 35 U.S.C. 154(b) by 20 days.

(21) Appl. No.: 10/502,935

(22) PCT Filed: Jul. 4, 2003

(86) PCT No.: PCT/JP03/08567

§ 371 (c)(1),
(2), (4) Date: Jul. 29, 2004

(87) PCT Pub. No.: WO2004/004916

PCT Pub. Date: Jan. 15, 2004

(65) Prior Publication Data

US 2005/0051642 A1    Mar. 10, 2005

(30) Foreign Application Priority Data

Jul. 5, 2002    (JP) .............................. 2002-196829

(51) Int. Cl.
 B05B 1/34    (2006.01)
 B23P 15/28   (2006.01)
 B26D 1/00    (2006.01)
 B26D 3/00    (2006.01)
 B01F 5/06    (2006.01)

(52) U.S. Cl. .................... 239/466; 239/463; 239/487; 239/488; 138/42; 407/11; 366/339

(58) Field of Classification Search ............... 239/466, 239/463, 487, 488, 381–383, 474, 486, 590; 138/42, 114; 407/11; 366/339, 305
See application file for complete search history.

(56) References Cited

U.S. PATENT DOCUMENTS

| 3,953,002 A | * | 4/1976 | England et al. ............. 366/322 |
| 4,538,920 A | * | 9/1985 | Drake ..................... 366/181.5 |
| 4,747,697 A | * | 5/1988 | Kojima ........................ 366/339 |
| 5,174,653 A | * | 12/1992 | Halat et al. ................. 366/339 |

(Continued)

FOREIGN PATENT DOCUMENTS

DE    19608485    9/1997

(Continued)

OTHER PUBLICATIONS

CD-ROM of the specification and drawings annexed to the request of Japanese Utility Model Application No. 67925/1991 (Laid-open No. 86445/1993) (Masakatsu WAKATSUKI), Nov. 22, 1993.

Primary Examiner—David A. Scherbel
Assistant Examiner—Darren Gorman
(74) Attorney, Agent, or Firm—Wenderoth, Lind & Ponack, L.L.P.

(57) ABSTRACT

A fluid discharge pipe structure comprises a cylindrical body, an inlet side connection member having a through hole formed in one end part of the cylindrical body, an outlet side connection member having a through hole formed in another end part of the cylindrical body, a spiral blade body having spiral blades on an outer circumference thereof and provided close to the inlet side connection member of the cylindrical body, and a flip-flop phenomenon generating shaft body provided close to the outlet side connection member of the cylindrical body.

20 Claims, 6 Drawing Sheets

U.S. PATENT DOCUMENTS

| | | |
|---|---|---|
| 5,226,506 A | 7/1993 | Link |
| 5,399,015 A * | 3/1995 | Zhi-qiang et al. .......... 366/339 |
| 6,071,047 A * | 6/2000 | Nakai ......................... 409/131 |
| 6,480,281 B1 * | 11/2002 | Van Der Mark et al. ... 356/432 |
| 6,579,001 B1 * | 6/2003 | Krumbock et al. ........... 366/91 |
| 2002/0075755 A1 * | 6/2002 | Huber et al. ............. 366/152.1 |

FOREIGN PATENT DOCUMENTS

| | | |
|---|---|---|
| EP | 0360371 | 3/1990 |
| JP | 63267425 | 4/1988 |
| JP | 11-333663 | 12/1999 |
| JP | 2001353431 | 12/2001 |

\* cited by examiner

FLUID DELIVERY TUBE STRUCTURAL BODY

TECHNICAL FIELD

The present invention relates to a fluid discharge pipe structure which is used, for feeding a coolant (cooling water) or a cutting and grinding lubricant to a contact part of a work, with a cutter of various kinds of machine tools including a cutting machine and a grinding machine, and for feeding a lubricating oil to a crank of an engine, a crank of a press, a wire drawing die or the like.

BACKGROUND ART

In general, when a metal or the like is machined into a desired shape, a work fixed to a predetermined position is formed into the desired shape by a machine tool such as a lathe, a drilling machine, and a milling machine while applying a cutter such as a cutting tool and a drill to the work.

During this machining operation, a coolant stored in a tank provided on the machine tool or the like is fed to the cutter and the work by a pump via a pipe and a nozzle so that degradation of hardness of a blade tip, distortion of the work, deposition of the work on the blade tip or the like caused by frictional heat can be prevented, and chips can be easily removed.

It has been expected in the metal working industry that coolant or the like of higher cooling performance can be fed to the cutter and the work, service life of the cutter can be prolonged, a period for exchanging the cutter is prolonged, a running cost can be reduced considerably, and any adverse effect on the blade tip and the work by frictional heat can be further reduced.

SUMMARY OF THE INVENTION

The present invention is developed in light of the above points. An object of the present invention is to provide a fluid discharge pipe structure which can feed a coolant and a cutting and grinding lubricant of high cooling effect to a work which is machined by various kinds of machine tools and a cutter thereof, considerably improve a service life of the cutter, and feed a liquid lubricant to a desired member of various kinds of devices and appliances.

In order to effectively achieve the object, the present invention has a following configuration. A fluid discharge pipe structure of the present invention comprises a cylindrical body, an inlet side connection member having a through hole formed in one end part of the cylindrical body, an outlet side connection member having a through hole formed in another end part of the cylindrical body, a spiral blade body having spiral blades on an outer circumference thereof and provided close to the inlet side connection member of the cylindrical body, and a flip-flop phenomenon generating shaft body provided close to the outlet side connection member of the cylindrical body.

In the above configuration, coolant or the like is fed from the inlet side connection member side into the cylindrical body, and passed through the spiral blade body to form a fierce whirl, and further passed through the flip-flop phenomenon generating shaft body to generate innumerable small vortexes together with turbulence, and discharged along an inner wall surface of the outlet side connection member. By feeding this discharged coolant or the like to a cutter of a machine tool and work, the vortexes are clung to surfaces of the cutter and the work, and a cooling effect can be further improved.

In addition, by feeding the coolant to the cutter of the machine tool and the work via this fluid discharge pipe structure, the coolant is clung more around the cutter and the work to effectively cool these members, prolongs a service life of the cutter used in this machining, and reduces cost considerably. Still further, by feeding the coolant, frictional heat caused by the machining is less easily accumulated inside the work, generation of distortion in the work can be suppressed, and continuous machining work to the finishing work can be efficiently performed.

According to the fluid discharge pipe structure of the present invention, one end part of the flip-flop phenomenon generating shaft body is formed in a truncated conical shape, and another end part thereof is formed in a conical shape in the above fluid discharge pipe structure, and a large number of diamond-shaped projecting parts are formed with predetermined regularity on an outer circumferential surface of a shaft part between these end parts. As a result, a flip-flop phenomenon can be effectively generated, the Coanda effect is improved, and coolant or the like of improved cooling performance can be fed.

In the above configuration, when coolant passes through the flip-flop phenomenon generating shaft body in the cylindrical body, a pulsating flow can be rectified once by a space between one end part of the truncated conical shape and the cylindrical body. By allowing the coolant or the like with this rectified pulsating flow to pass through spaces between a large number the diamond-shaped projecting parts (a plurality of flow passages) with predetermined regularity, the flip-flop phenomenon is generated. By allowing the coolant or the like to pass through the spaces between the other end part of the conical shape and the cylindrical body, the Coanda effect that the coolant with vortexes generated therein passes along an inner wall surface is increased.

According to the fluid discharge pipe structure of the present invention, each of a large number of the diamond-shaped projecting parts with predetermined regularity formed on the outer circumferential surface of the shaft part of the flip-flop phenomenon generating shaft body in the above fluid discharge pipe structure is a diamond with both top parts forming an acute angle of 28°, and inclined at an angle of 75° to 76° with respect to a horizontal line in plan view of the shaft part, and formed alternately on the outer circumferential surface of the shaft part in a vertical direction and a right-to-left direction.

By the above-described configuration, coolant or the like containing innumerable small vortexes can be obtained by optimally generating the flip-flop phenomenon.

According to the fluid discharge pipe structure of the present invention, the inlet side connection member having a through hole in the fluid discharge pipe structure has a rectifying space part to rectify flow of fluid at a position close to the inlet side connection member of the spiral blade body provided within the cylindrical body when the inlet side connection member is provided on one end part of the cylindrical body.

By the above-described configuration, when coolant or the like is fed by a pump, a pulsating flow of the coolant which flows into the cylindrical body as a rightward swirl or a leftward swirl according to a rotational direction of the pump can be rectified by providing the rectifying space part.

According to the fluid discharge pipe structure of the present invention, in the outlet side connection member having a through hole in the fluid discharge pipe structure, an inner circumferential wall corresponding to one end part of the flip-flop phenomenon generating shaft body via a passage is tapered with a diameter on the fluid discharge side being gradually contracted.

According to the above configuration, the Coanda effect of coolant or the like passing through the flip-flop phenomenon generating shaft body is increased by a tapered inner circumferential wall of the outlet side connection member, and the coolant or the like is effectively discharged along an inner circumferential wall to further increase clinging thereof to a cutter of a machine tool and work.

Coolant or the like passing through the flip-flop phenomenon generating shaft body increases the Coanda effect thereof by the tapered inner circumferential wall of the outlet side connection member, and further improves a cooling effect and a lubricating effect by being clung around an outer surface when discharged from the cylindrical body, and fed to a cutter of a machine tool and work or the like.

In addition, according to the fluid discharge pipe structure of the present invention, the spiral blade body has spiral blades of a thickness of 2 mm, a depth of 9 mm and a flute width of 8 mm which are inclined at an angle of 75° to 76° to a horizontal line in a plan view on an outer circumference of the shaft part.

According to the above configuration, a fierce whirl can be effectively generated in coolant or the like fed to the cylindrical body.

DETAILED DESCRIPTION OF THE PREFERRED EMBODIMENTS

Embodiments of the present invention will be described below.

Figure 1:
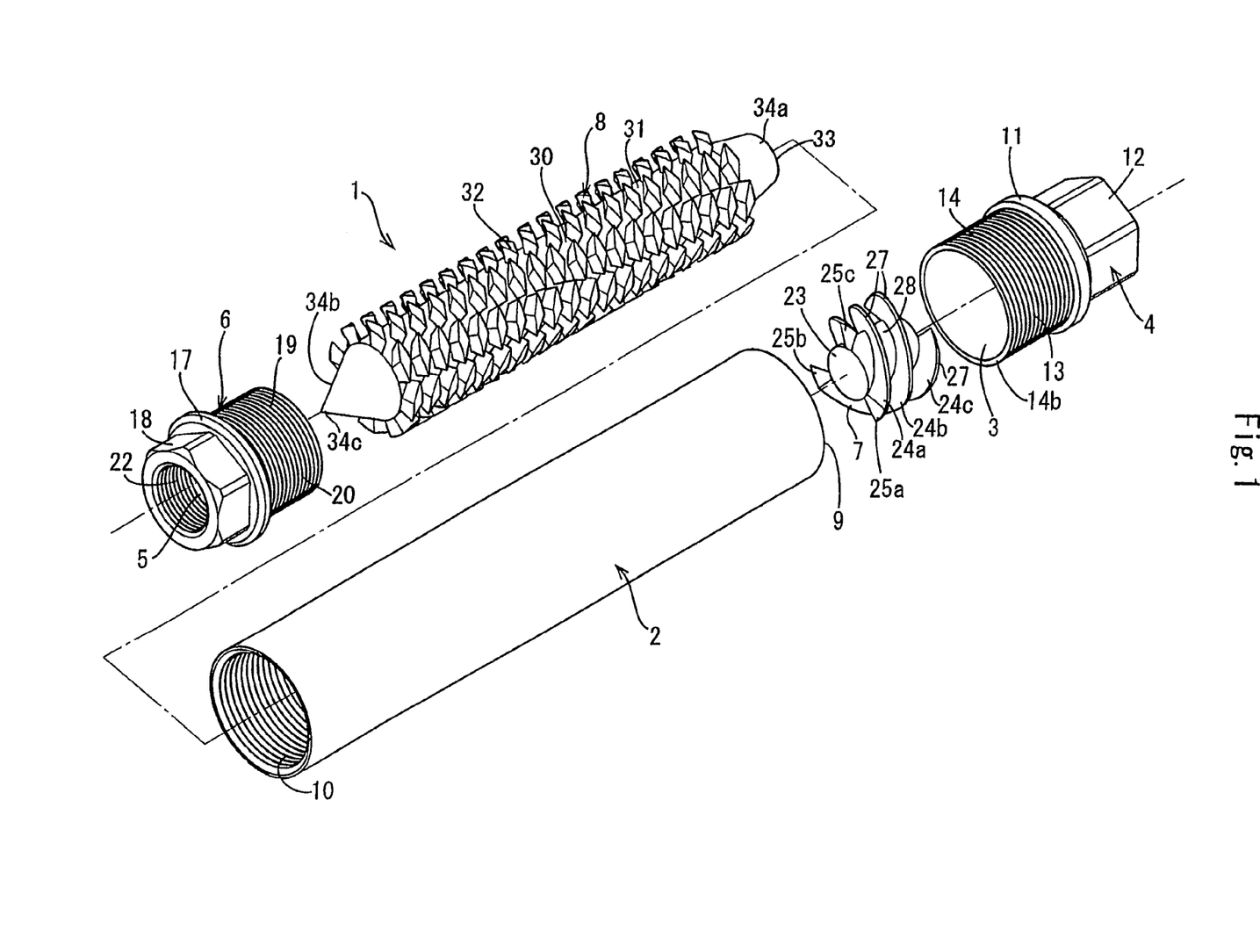
FIG. 1 is an assembly view of a fluid discharge pipe structure in accordance with the present invention.
Figure 2:
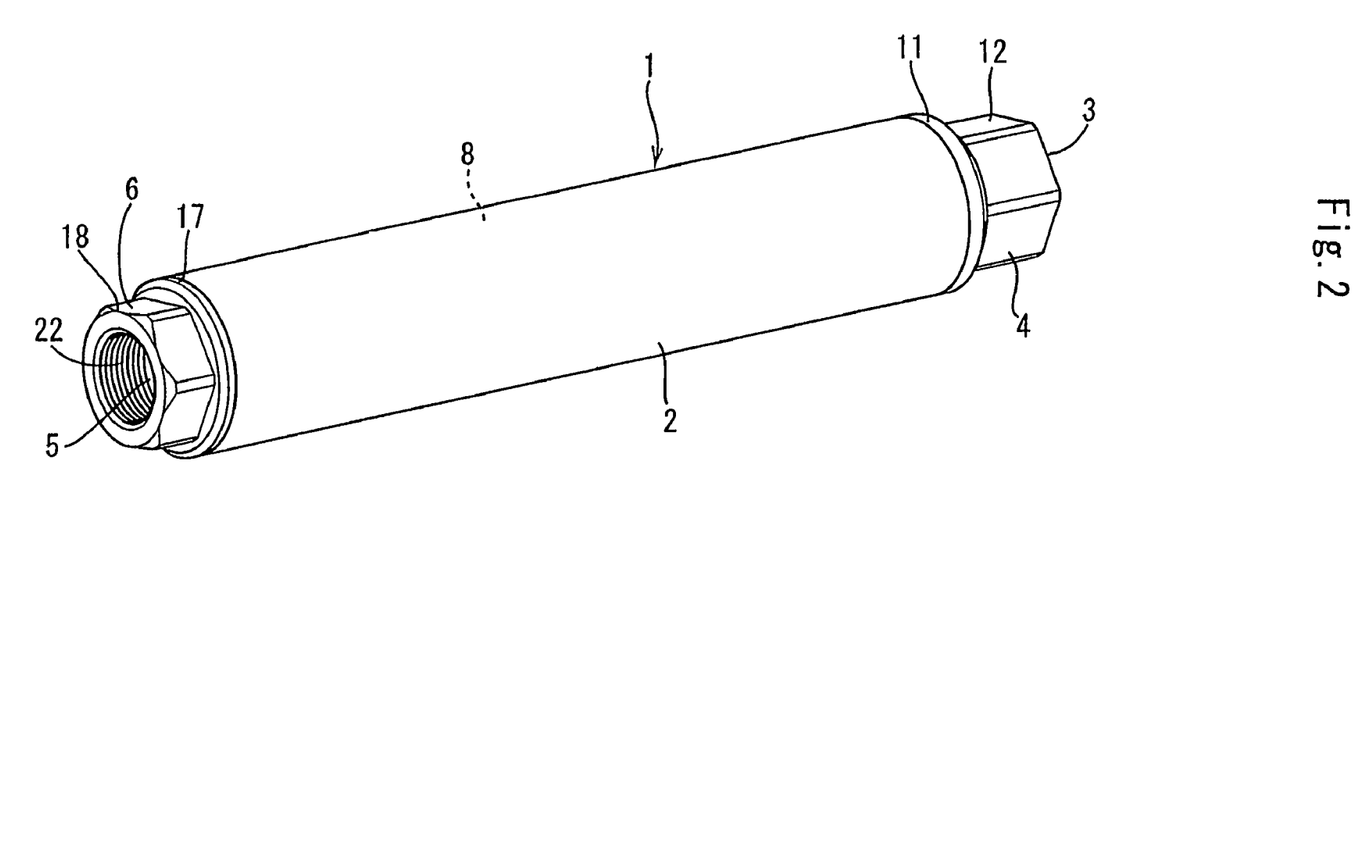
FIG. 2 is a perspective view of the fluid discharge pipe structure in accordance with the present invention.
Figure 3:
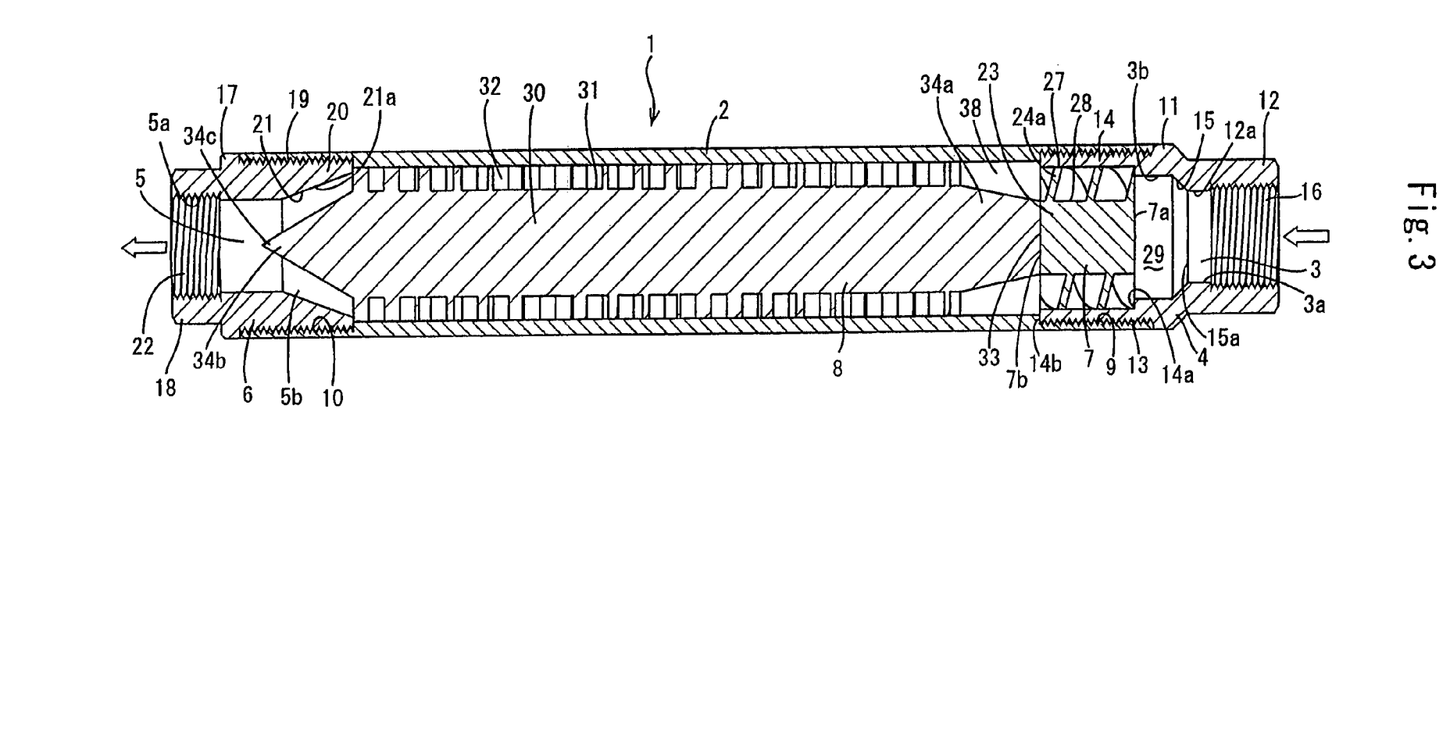
FIG. 3 is a longitudinal sectional view of the fluid discharge pipe structure in accordance with the present invention.
Figure 4:
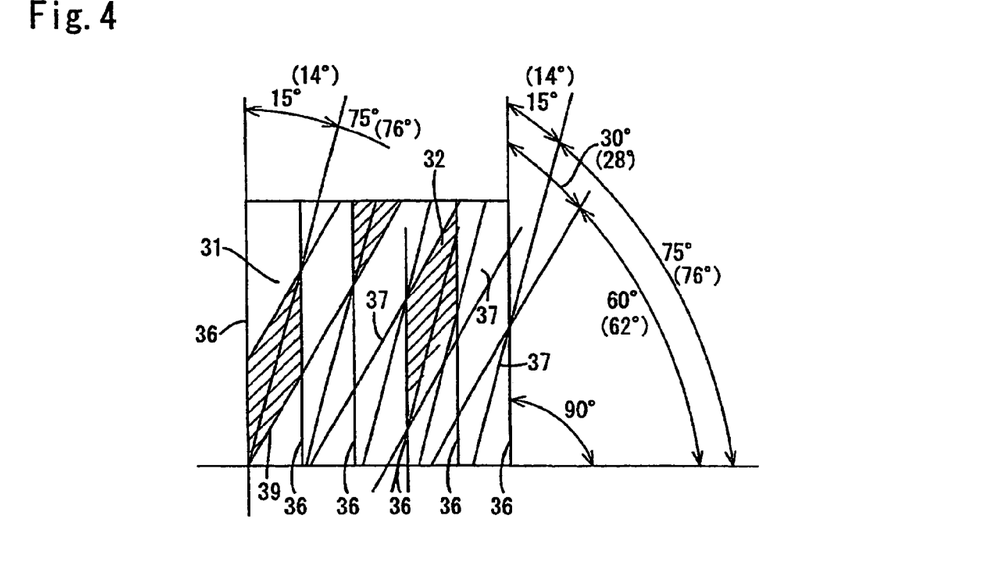
FIG. 4 is a schematic representation of a large number of regularly disposed diamond-shaped projecting parts of a flip-flop phenomenon generating shaft body in accordance with the present invention.
Figure 5:
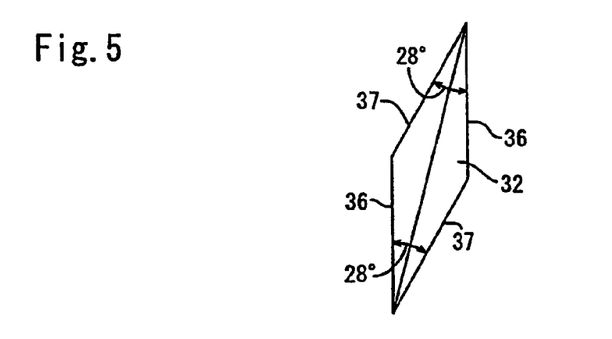
FIG. 5 is a schematic representation of one diamond-shaped projecting part of the flip-flop phenomenon generating shaft body in accordance with the present invention.
Figure 6:
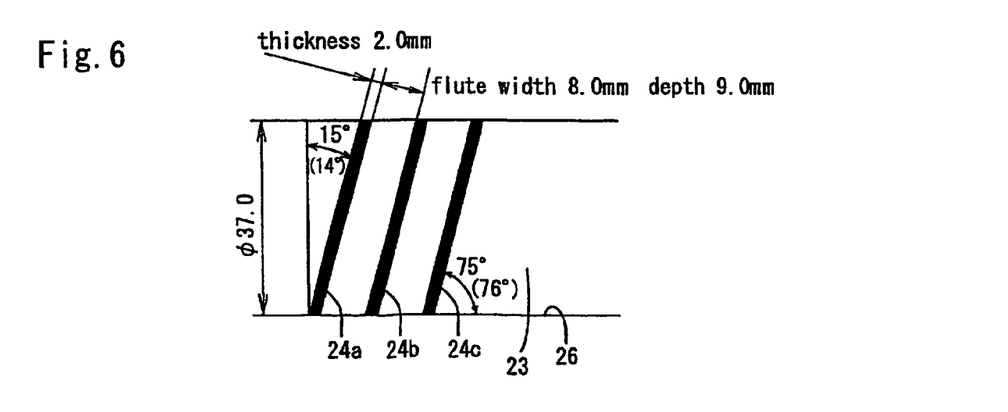
FIG. 6 is a schematic representation of a spiral blade formed on a spiral blade body in accordance with the present invention.
Figure 7:
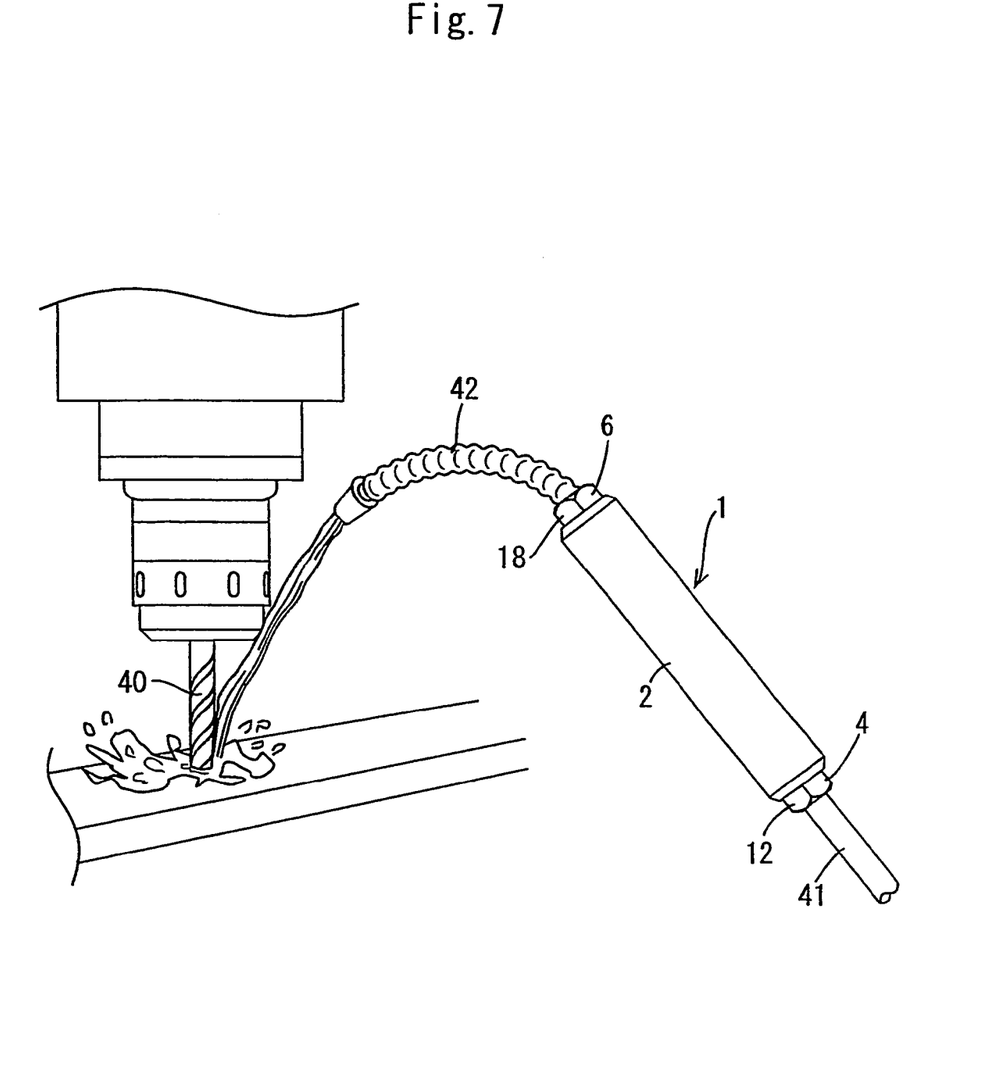
FIG. 7 is a schematic representation of an application of the fluid discharge pipe structure in accordance with the present invention.

FIGS. 1 to 7 show a fluid discharge pipe structure 1 in accordance with the present invention. FIG. 1 is an assembly view of the fluid discharge pipe structure of the present invention, FIG. 2 is a perspective view of the fluid discharge pipe structure of the present invention, FIG. 3 is a longitudinal sectional view of the fluid discharge pipe structure of the present invention, FIG. 4 is a schematic representation of a large number of regularly disposed diamond-shaped projecting parts of a flip-flop phenomenon generating shaft body of the present invention, FIG. 5 is a schematic representation of one diamond-shaped projecting part of the flip-flop phenomenon generating shaft body of the present invention, FIG. 6 is a schematic representation of a spiral blade formed on a spiral blade body of the present invention, and FIG. 7 is a schematic representation of an application of the fluid discharge pipe structure of the present invention.

As shown in FIGS. 1 to 3, the fluid discharge pipe structure 1 comprises a cylindrical body 2, an inlet side connection member 4 having a through hole 3, an outlet side connection member 6 having a through hole 5, a spiral blade body 7, and a flip-flop phenomenon generating shaft body 8.

More specifically, the cylindrical body 2 (refer to FIGS. 1 and 3) is a straight cylindrical metal pipe of a predetermined diameter and length, and female screws 9 and 10 to which the inlet side connection member 4 and the outlet side connection member 6 are screwed and fitted are formed on inner circumferential surfaces of both ends.

The inlet side connection member 4 having the through hole 3 (refer to FIGS. 1 and 3) comprises a flange part 11 which is formed substantially at a center thereof, a hexagonal nut part 12 formed on one side of the flange part 11, and a cylindrical part 14 having a male screw 13 screwed to the female screw 9 of the cylindrical body 2 and formed on another side of the flange part 11. A tapered part 15 is formed on an inner side of the flange part 11. A diameter of a through hole 3a on the nut part 12 side is smaller than a diameter of a through hole 3b of the cylindrical part 14, and the tapered part 15 is located between the through hole 3a and the through hole 3b with a diameter gradually increased from the through hole 3a side to the through hole 3b side.

A stepped part 14a is formed on an inner circumferential surface of the cylindrical part 14 with an inside diameter defined by the stepped part close to the tapered part 15 being slightly smaller than another inside diameter defined by the stepped part. A length from an end 14b of this cylindrical part 14 to the stepped part 14a is equal to a total length of a spiral blade body 7 which will be described below, and when the spiral blade body 7 is stored in the cylindrical part 14, an end 7a of the spiral blade body 7 is abutted on the stepped part 14a, and locked thereto, and an end 7b of the spiral blade body 7 is flush with an end 14b of the cylindrical part 14. When the spiral blade body 7 is stored in the cylindrical part 14, a rectifying space part 29 to rectify pulsating flow of a coolant or the like is formed between the end 7a of the spiral blade body 7 and a small diameter end 15a of the tapered part 15. The nut part 12 has a female screw 16 on an inner circumferential surface thereof so that another pipe can be screwed therein and connected thereto.

The outlet side connection member 6 having a through hole 5 (refer to FIGS. 1 and 3) comprises a flange part 17 formed close to one end, a hexagonal nut part 18 formed on one side of this flange part 17, and a cylindrical part 20 having a male screw 19 which is screwed to the female screw 10 of the cylindrical body 2 on another side of the flange part 17. A tapered part 21 is formed on an inner side of this cylindrical part 20. A diameter of the through hole 5a on the nut part 18 side is smaller than a diameter of the through hole 5b of the cylindrical part 20. The tapered part 21 is formed in a truncated conical shape in which a diameter is gradually increased from a middle part to an end of the cylindrical part 20. The nut part 18 has a female screw 22 on an inner circumferential surface, to which another pipe can be screwed therein and connected thereto.

The spiral blade body 7 (refer to FIGS. 1 and 3) is formed of a short metal columnar member having an outside diameter by which the spiral blade body is brought close to an inner circumferential surface of the cylindrical body 2 when accommodated therein, and comprises a shaft part 23 of a circular section and three spiral blades 24a, 24b and 24c. The blades 24a, 24b and 24c are located with respective end parts 25a, 25b and 25c deviated from each other in a circumferential direction of the shaft part 23 by 120°, and formed spiral counterclockwise with a predetermined space on an outer circumferential surface from one end of the shaft part 23 to another end thereof.

Each of the blades 24a, 24b and 24c is formed on the outer circumferential surface of the shaft part 23 in a spiral manner at an angle of 75° to 76° with respect to horizontal line 26 in plan view as shown in FIG. 6. A flute width which is a spacing between the blades 24a, 24b and 24c is set to be 8 mm, a thickness of the blades 24a, 24b and 24c is set to be 2 mm, and a depth from an outer end 27 of each of the blades 24a, 24b and 24c to an outer circumferential surface 28 of the shaft part 23 is set to be 9 mm. All end parts 25a, 25b and 25c of the blades 24a, 24b and 24c are formed in a blade shape of an acute angle.

The flip-flop phenomenon generating shaft body 8 (refer to FIGS. 1, 3 to 5) has an outside diameter by which the shaft body is brought close to an inner circumferential surface of the cylindrical body 2 when accommodated therein, and formed of a metal columnar member having a length of about 4/5 of a length of the cylindrical body 2, and has a large number of diamond-shaped projecting parts 32 with predetermined regularity on an outer circumferential surface 31 of a shaft part 30 of a circular section.

In other words, in this flip-flop phenomenon generating shaft body 8, one end part 34a located on the spiral blade body 7 side, when the shaft body is accommodated in the cylindrical body 2, is formed in a truncated conical shape, and another end part 34b located on the outlet side connection member 6 side is formed in a conical shape. The another part 34b is located in a tapered part 21 of the outlet side connection member 6 with an angle of a top part 34c being 60°, and faces an inclined inner surface 21a of the tapered part 21 with a predetermined spacing therebetween.

In addition, a large number of the diamond-shaped projecting parts 32 with predetermined regularity are formed on the outer circumferential surface 31 of the shaft part 30 of the flip-flop phenomenon generating shaft body 8. Each diamond-shaped projecting part 32 is formed by grinding a columnar member so as to be externally projected from the outer circumferential surface 31.

In other words, in each diamond-shaped projecting part 32 (refer to FIG. 4), a plurality of lines 36 with predetermined spacing therebetween in a direction (a circumferential direction) at 90° to a longitudinal direction of the columnar member, and lines 37 at the angle of 60° (or 62°) to the longitudinal direction with a predetermined spacing therebetween, are intersected with each other, and spaces between line 36 and an adjacent line 36 are ground alternately, and spaces between diagonal line 37 and an adjacent diagonal line 37 are ground alternately. Each diamond-shaped projecting part is projected from the outer circumferential surface 31 of the shaft part 30 alternately in a vertical direction (circumferential) and the right-to-left direction (the longitudinal direction of the shaft part 30).

By thus forming each diamond-shaped projecting part 32, a large number of diamond-shaped projecting parts 32 are arranged with predetermined regularity on the outer circumferential surface 31 of the shaft part 30 between both end parts 34a and 34b.

As described above, in the fluid discharge pipe structure 1 (refer to FIGS. 1 to 3) comprising the cylindrical body 2, the inlet side connection member 4, the outlet side connection member 6, the spiral blade body 7, and the flip-flop phenomenon generating shaft body 8, the outlet side connection member 6 is screwed in and fitted to one end part of the cylindrical body 2, the conical end part 34b of the flip-flop phenomenon generating shaft body 8 is inserted in this cylindrical body 2 from the other end part thereof, the spiral blade body 7 is then inserted, and finally the inlet side connection member 4 is screwed in and fitted to one end part of the cylindrical body 2.

A tip 33 (refer to FIG. 3) of one end part of a truncated conical shape of the flip-flop phenomenon generating shaft body 8 is abutted on one side (one end 7b) of the spiral blade body 7. The spiral blade body 7 is held by the flip-flop phenomenon generating shaft body 8 and the stepped part 14a of the inlet side connection member 4, and accommodated in the cylindrical body 2.

In this thus-assembled fluid discharge pipe structure 1, a male screw threaded at an end part of a pipe 41 as shown in FIG. 7 is screwed in and connected to the female screw 16 (refer to FIG. 3) of the nut part 12 of the inlet side connection member 4, and a male screw threaded at a rear end part of a nozzle 42 led to a cutter 40 (for example, a drill) of a machine tool to feed coolant or the like is screwed in and connected to the female screw 22 (refer to FIG. 3) of the outlet side connection member 6.

The coolant or the like is fed to the cutter 40 side of the machine tool by an electrically-driven pump. The coolant or the like passes through the fluid discharge pipe structure 1 provided on a distal side of the nozzle 42 disposed in the vicinity of the cutter 40.

Description is made of flow when the coolant or the like passes through the fluid discharge pipe structure 1. The coolant or the like flowing in from the through hole 3 of the nut part 12 of the inlet side connection member 4 (refer to FIG. 3) via the pipe 41 (refer to FIG. 7) from a right-turning or left-turning electrically-driven pump strikes the flat end 7a of the spiral blade body 7, and a pulsating flow can be rectified by the rectifying space part 29 by utilizing conformability of the coolant.

The coolant or the like of this rectified pulsating flow flows between the blades 24a, 24b and 24c of the spiral blade body 7 which are formed counterclockwise. In this condition, the coolant is formed into a fierce whirl by the blades 24a, 24b and 24c, fed into one end part 34a of a truncated conical shape of the flip-flop phenomenon generating shaft body 8, and the pulsating flow is again rectified by conformability of the coolant or the like in a space 38 between this end part 34a and the cylindrical body 2. The coolant or the like is fed into space (a plurality of flow passages) between a large number of the diamond-shaped projecting parts 32 with predetermined regularity formed on the outer circumferential surface 31 of the shaft part 30.

The coolant or the like passing through these spaces between the large number of diamond-shaped projecting parts 32 with regularity (a plurality of flow passages) flows in turbulent generating innumerable small vortexes toward the other end part 34b side of the flip-flop phenomenon generating shaft body 8 while causing a flip-flop phenomenon (the flip-flop phenomenon is a phenomenon in which fluid flows with a fluid flowing direction alternately changed in a periodical manner). In the coolant or the like flowing into the other conical end part 34*b*, the flip-flop phenomenon thereof is canceled by generation of a whirl exceeding the flip-flop phenomenon caused by a size of a space from the outlet side connection member 6. However, a clinging phenomenon is induced by amplifying the Coanda effect (a phenomenon that the fluid is sucked to a wall surface by pressure reduction between the fluid and the wall surface when the fluid flows along the wall surface), and the coolant or the like is discharged from the through hole 5 of the outlet side connection member 6.

When the coolant or the like discharged from the fluid discharge pipe structure 1 is fed to the cutter or work, the coolant or the like sticks and clings thereto by the Coanda effect or the like, which clinging phenomenon remarkably occurs to cover a surface of the cutter and the work and increase adhesiveness. As a result, even when the cutter is rotated at a high speed, a part of the coolant or the like is scattered while remaining coolant or the like clings to the cutter and the work, whereby a cooling effect is increased by a large amount of the coolant or the like being clung to the cutter and the work.

As described above, by providing the fluid discharge pipe structure 1 of the present invention on a coolant feed line for a machine tool or the like, little heat generation can be detected from a cutter and work not only when the cutter is rotated at a normal speed, but also when the cutter is rotated for machining at a speed about 10 times as high as the normal speed. In addition, by providing the fluid discharge pipe structure of the present invention within 1.5 m from a nozzle tip, a cooling capacity can be effectively demonstrated.

Figure 8:
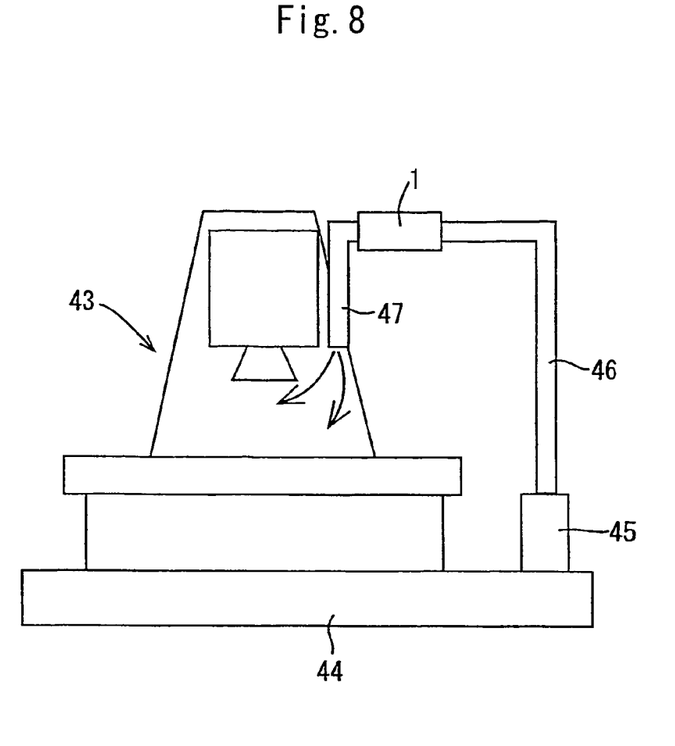
FIG. 8 is a schematic view of the fluid discharge pipe structure in accordance with the present invention disposed on a milling machine.
Figure 9:
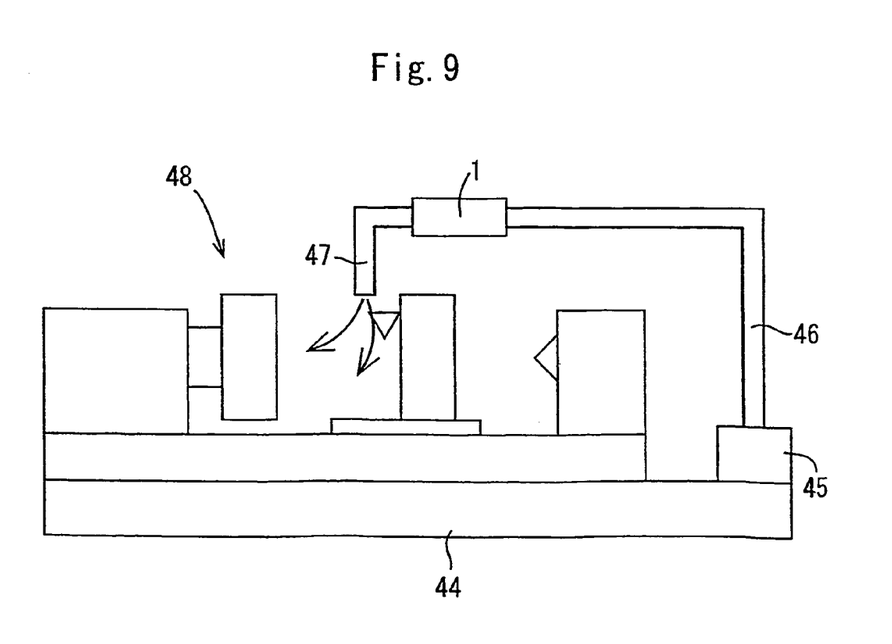
FIG. 9 is a schematic-view of the fluid discharge pipe structure in accordance with the present invention disposed on a lathe.

The fluid discharge pipe structure of the present invention can be provided on a lubricating oil feed line to a machining center, a numerically controlled milling machine, a general purpose milling machine, a numerically controlled lathe, a general purpose lathe, a grinding machine, a spindle coolant-through type machine, a special purpose machine, a transfer machine, a radial drilling machine, a cutting machine, a band saw, other cutting and grinding machines, an engine crank, a press crank, a wire drawing die, or the like. Needless to say, the fluid discharge pipe structure of the present invention can be freely used for other devices and machines or a feed line of various kinds of fluid. FIG. 8 is a schematic view of the fluid discharge pipe structure 1 of the present invention provided on a milling machine 43. Reference numeral 44 denotes a storage tank of coolant or the like, reference numeral 45 denotes a pump, reference numeral 46 denotes a pipe, and reference numeral 47 denotes a nozzle. FIG. 9 is a schematic view of the fluid discharge pipe structure 1 of the present invention provided on a milling machine 48. An operation and effect of the fluid discharge pipe structure 1 in the milling machine 43 and the milling machine 48 are similar to the above-described ones, and description thereof is omitted. In addition, each numeral in the figures is an optimum example, and, for example, an angle of both top parts of the diamond-shaped projecting part is not limited to 28°, but may be design-changed to another angle. Further, the angle with respect to the horizontal line in plan view of the shaft part is not limited to 75° to 76°, but may be 75° or under, or 76° or over. This is similar to the spiral blade.

The invention claimed is:

1. A fluid discharge pipe structure comprising:
   a cylindrical body;
   an inlet side connection member, having a through hole, to be attached to one end part of said cylindrical body;
   an outlet side connection member, having a through hole, to be attached to another end part of said cylindrical body;
   a spiral blade body, having spiral blades on an outer circumference thereof, to be positioned within said cylindrical body at the one end part of said cylindrical body; and
   a flip-flop phenomenon generating shaft body to be positioned within said cylindrical body between said spiral blade body and an outlet of said through hole of said outlet side connection member when said spiral blade body is positioned within said cylindrical body and said outlet side connection member is attached to the another end part of said cylindrical body, said flip-flop phenomenon generating shaft body including
   (i) a truncated conically shaped first end part,
   (ii) a conically shaped second end part,
   (iii) a shaft part between said truncated conically shaped first end part and said conically shaped second end part, and
   (iv) diamond-shaped projecting parts arranged with predetermined regularity on an outer circumferential surface of said shaft part.

2. The fluid discharge pipe structure according to claim 1, wherein
   each of said diamond-shaped projecting parts has two top surfaces inclined at an angle of from 75° to 76° with respect to a longitudinal axis of said shaft part and forming an angle of 28° with a line orthogonal to the longitudinal axis.

3. The fluid discharge pipe structure according to claim 2, wherein
   said inlet side connection member includes a rectifying space part for rectifying fluid flow adjacent said spiral blade body when said inlet side connection member is attached to the one end part of said cylindrical body and said spiral blade body is positioned within said cylindrical body.

4. The fluid discharge pipe structure according to claim 3, wherein
   an inner circumferential wall defining said through hole of said outlet side connection member is tapered in a direction from an inlet of said through hole of said outlet side connection member to the outlet of said through hole of said outlet side connection member, and cooperates with said conically shaped second end part of said flip-flop phenomenon generating shaft body to define a passage.

5. The fluid discharge pipe structure according to claim 4, wherein
   said spiral blades are inclined at an angle of from 75° to 76° with respect to a longitudinal axis of said spiral blade body and define a flute width of 8 mm, and
   each of said spiral blades has a thickness of 2 mm and a depth of 9 mm.

6. The fluid discharge pipe structure according to claim 3, wherein
   said spiral blades are inclined at an angle of from 75° to 76° with respect to a longitudinal axis of said spiral blade body and define a flute width of 8 mm, and
   each of said spiral blades has a thickness of 2 mm and a depth of 9 mm.

7. The fluid discharge pipe structure according to claim 2, wherein
   an inner circumferential wall defining said through hole of said outlet side connection member is tapered in a direction from an inlet of said through hole of said outlet side connection member to the outlet of said through hole of said outlet side connection member, and cooperates with said conically shaped second end part of said flip-flop phenomenon generating shaft body to define a passage.

8. The fluid discharge pipe structure according to claim 7, wherein
said spiral blades are inclined at an angle of from 75° to 76° with respect to a longitudinal axis of said spiral blade body and define a flute width of 8 mm, and
each of said spiral blades has a thickness of 2 mm and a depth of 9 mm.

9. The fluid discharge pipe structure according to claim 2, wherein
said spiral blades are inclined at an angle of from 75° to 76° with respect to a longitudinal axis of said spiral blade body and define a flute width of 8 mm, and
each of said spiral blades has a thickness of 2 mm and a depth of 9 mm.

10. The fluid discharge pipe structure according to claim 1, wherein
said inlet side connection member includes a rectifying space part for rectifying fluid flow adjacent said spiral blade body when said inlet side connection member is attached to the one end part of said cylindrical body and said spiral blade body is positioned within said cylindrical body.

11. The fluid discharge pipe structure according to claim 10, wherein
an inner circumferential wall defining said through hole of said outlet side connection member is tapered in a direction from an inlet of said through hole of said outlet side connection member to the outlet of said through hole of said outlet side connection member, and cooperates with said conically shaped second end part of said flip-flop phenomenon generating shaft body to define a passage.

12. The fluid discharge pipe structure according to claim 11, wherein
said spiral blades are inclined at an angle of from 75° to 76° with respect to a longitudinal axis of said spiral blade body and define a flute width of 8 mm, and
each of said spiral blades has a thickness of 2 mm and a depth of 9 mm.

13. The fluid discharge pipe structure according to claim 10, wherein
said spiral blades are inclined at an angle of from 75° to 76° with respect to a longitudinal axis of said spiral blade body and define a flute width of 8 mm, and
each of said spiral blades has a thickness of 2 mm and a depth of 9 mm.

14. The fluid discharge pipe structure according to claim 1, wherein
an inner circumferential wall defining said through hole of said outlet side connection member is tapered in a direction from an inlet of said through hole of said outlet side connection member to the outlet of said through hole of said outlet side connection member, and cooperates with said conically shaped second end part of said flip-flop phenomenon generating shaft body to define a passage.

15. The fluid discharge pipe structure according to claim 14, wherein
said spiral blades are inclined at an angle of from 75° to 76° with respect to a longitudinal axis of said spiral blade body and define a flute width of 8 mm, and
each of said spiral blades has a thickness of 2 mm and a depth of 9 mm.

16. The fluid discharge pipe structure according to claim 1, wherein
said spiral blades are inclined at an angle of from 75° to 76° with respect to a longitudinal axis of said spiral blade body and define a flute width of 8 mm, and
each of said spiral blades has a thickness of 2 mm and a depth of 9 mm.

17. A fluid discharge pipe structure comprising:
a cylindrical body;
an inlet side connection member, having a through hole, to be attached to one end part of said cylindrical body;
an outlet side connection member, having a through hole, to be attached to another end part of said cylindrical body;
a spiral blade body, having spiral blades on an outer circumference thereof, to be positioned within said cylindrical body at the one end part of said cylindrical body; and
a flip-flop phenomenon generating shaft body to be positioned within said cylindrical body between said spiral blade body and an outlet of said through hole of said outlet side connection member when said spiral blade body is positioned within said cylindrical body and said outlet side connection member is attached to the another end part of said cylindrical body,
wherein said inlet side connection member includes a rectifying space part for rectifying fluid flow adjacent said spiral blade body when said inlet side connection member is attached to the one end part of said cylindrical body and said spiral blade body is positioned within said cylindrical body.

18. The fluid discharge pipe structure according to claim 17, wherein
said flip-flop phenomenon generating shaft body includes a conically shaped end part, and
an inner circumferential wall defining said through hole of said outlet side connection member is tapered in a direction from an inlet of said through hole of said outlet side connection member to the outlet of said through hole of said outlet side connection member, and cooperates with said conically shaped end part of said flip-flop phenomenon generating shaft body to define a passage.

19. The fluid discharge pipe structure according to claim 18, wherein
said spiral blades are inclined at an angle of from 75° to 76° with respect to a longitudinal axis of said spiral blade body and define a flute width of 8 mm, and
each of said spiral blades has a thickness of 2 mm and a depth of 9 mm.

20. The fluid discharge pipe structure according to claim 17, wherein
said spiral blades are inclined at an angle of from 75° to 76° with respect to a longitudinal axis of said spiral blade body and define a flute width of 8 mm, and
each of said spiral blades has a thickness of 2 mm and a depth of 9 mm.

* * * * *